US005425998A

United States Patent [19]

Minakawa et al.

[11] Patent Number: 5,425,998

[45] Date of Patent: Jun. 20, 1995

[54] PAPER PLATE FOR OFFICE OFFSET PRINTING AND ITS MANUFACTURING METHOD

[75] Inventors: Masami Minakawa; Akiyo Kanbara; Koichi Kamoi, all of Tokyo, Japan

[73] Assignee: Gradco (Japan) Ltd., Tokyo, Japan

[21] Appl. No.: 145,559

[22] Filed: Nov. 4, 1993

[30] Foreign Application Priority Data

Nov. 10, 1992 [JP] Japan .................................. 4-323736

[51] Int. Cl.$^6$ ......................... B32B 25/08; B32B 25/12

[52] U.S. Cl. ..................................... 428/494; 428/195; 428/206; 428/211; 428/496

[58] Field of Search ............... 428/195, 342, 402, 510, 428/511, 513, 206, 211, 494, 496; 503/227; 490/538

[56] References Cited

U.S. PATENT DOCUMENTS

| | | | |
|---|---|---|---|
| 4,705,746 | 11/1987 | Tamagawa et al. | 430/538 |
| 5,320,898 | 6/1994 | Yoshida et al. | 428/195 |
| 5,328,749 | 7/1994 | Noda et al. | 428/195 |

OTHER PUBLICATIONS

Kono et al. JP 61-35986 Jul. 30, 1984 Patent Abstracts of Japan vol. 10, No. 191.

*Primary Examiner*—Patrick J. Ryan
*Assistant Examiner*—William A. Krynski
*Attorney, Agent, or Firm*—Newton N. Lee, Jr.

[57] ABSTRACT

A paper plate for office offset printing has at least one side of a base paper composed of a water resistant middle layer made primarily of synthetic latex and a hydrophilic surface layer, which is applied to the top of the water resistant middle layer, made primarily of colloidal silica particles 20 nm or less in diameter, a slip agent and an adhesive.

4 Claims, 2 Drawing Sheets

PAPER PLATE FOR OFFICE OFFSET PRINTING AND ITS MANUFACTURING METHOD

BACKGROUND OF THE INVENTION

It is a known manufacturing method for offset printing plates (Japanese Patent JP S51-8045) in which the base paper is coated with a water resistant middle layer and then on the top of the water resistant middle layer coated with a hydrophilic surface processing solution with a mixture of alginate and colloidal silica to form a water resistant layer by reacting with a polyvalent metallic salt at the surface and/or inside of the water resistant middle layer.

SUMMARY OF THE INVENTION

The purposes of this invention are to provide paper plates for office offset printing and also a manufacturing method for these plates, that do not require any special plate maker, do not cause stretch of the base plate and weakening of the plate strength or stiffness during plate making or offset printing, and allow stable paper handling during plate making by various types of copiers or printers as well as during offset printing by various types of office offset presses, thereby allowing easy plate making by electro-photographic copiers, laser printers, dot-matrix printers, thermal printers, or even handwriting with oil-based felt pens or ballpoint pens, and so forth.

Thus, the invention involves the development of a paper plate with a specific layered structure to satisfy these requirements.

A paper plate for office offset printing according to the invention inhibits plate fog, causes no stretching of the base plate and no weakening of the plate strength or stiffness by the etching solution or the dampening solution by various types of copiers or printers as well as during offset printing by various types of office offset presses as described above, and promotes more efficient use of various computer systems and office equipment.

DESCRIPTION OF THE PREFERRED EMBODIMENT

This invention addresses the purposes above and features a paper plate for office offset printing with a specific layered structure and a manufacturing method for the said paper plate.

This invention provides a paper plate for office offset printing that is composed of, on at least one side of the base paper, a water resistant middle layer made primarily of synthetic latex and, on the top of the middle layer, a hydrophilic surface layer made primarily of colloidal silica particles 20 nm or less in diameter, a slip agent with a polyethylene was emulsion, and an adhesive, and thus the invention provides a paper plate for office offset printing with the static friction coefficient of the plate surface ranging from 0.4 to 0.7 by "JIS"-P-8147 (Japanese Industrial Standard) that inhibits a plate fog, causes no stretching of the base plate and no weakening of the plate strength or stiffness by the etching solution during plate making or the dampening solution during offset printing, and in addition, allows stable paper handling during plate making by various types of copiers or printers as well as during offset printing by various types of small offset press.

This invention also provides a manufacturing method of a paper plate for office offset printing in which at least one side of the base paper is coated with a coating color made primarily of synthetic latex to form a water resistant middle layer, and is then to the tope of the middle layer coated with a coating color made primarily of colloidal silica particles 20 nm or less in diameter, a slip agent, and an adhesive to form a hydrophilic surface layer.

Figure 1:
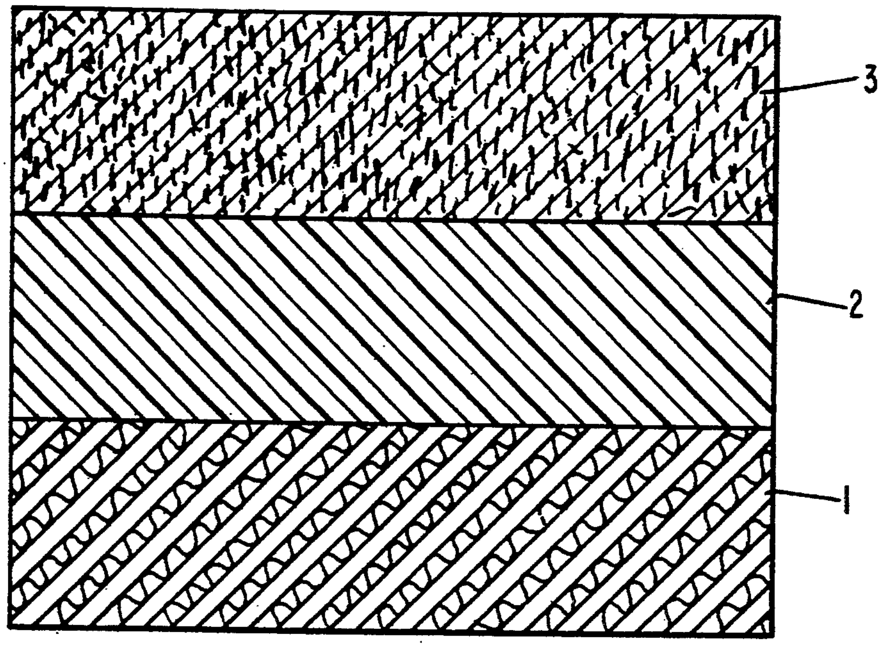
FIG. 1 is an enlarged fragmentary section showing the paper plate product.

According to this invention, referring first to FIG. 1 a wood free paper 1 is used as the base paper in which the basis weight ranges 60–150 g/m$^2$, and preferably ranges 80–120 g/m$^2$.

Since the surface of the paper plate is originally hydrophilic and highly absorbent, the etching solution during plate making and the dampening solution during offset printing easily penetrate the base paper that causes stretching of the base plate and weakening of the plate strength or the plate stiffness, and thus causes many troubles including unstable paper handling during plate making or offset printing. This invention eliminates those disadvantages by forming on at least one side of the base paper a water resistant middle layer 2, to provide a paper plate with highly water resistant and stable paper handling, resulting in greater ease of operation.

As the main component of the coating color that constitutes the water resistant middle layer, synthetic latex is used including the MBR groups or SBR groups, and preferably the MBR groups for plate fog and printing strength. As extenders, use is made successfully of ground calcium carbonate, aluminum hydroxide, talc, pigments of various clays, carboxymethyl cellulose, various cellulose derivatives, polyvinyl alcohol and its derivatives, and thickener like amide acrylate. These extenders can be contained among the coating color up to about 50% of the weight ratio of the synthetic latex.

On the top of the water resistant middle layer, a hydrophilic surface layer 3 is formed to make it suitable for offset printing. The coating formulation consists of colloidal silica as the hydrophilic agent, followed by adding a pigment for improving a writing surface, a slip agent for keeping a better slipability that includes an adhesive agent and a water resistant agent, and so forth.

The colloidal silica used here must have a particle size of 20 nm or less in diameter. Larger particles cause a stronger level of plate fog that is difficult for practical use.

As a pigment that improves a writing surface, ground calcium carbonate is used for the most frequently preferred choice, in which the mixture ratio among colloidal silica ranges 10–150 weight percent, and preferably ranges 50–110 weight percent. (Hereinafter, the mixture ratio is expressed as the weight percent in proportion to the 100 weight percent of colloidal silica).

As a slip agent that provides a better slipability, polyethylene wax emulsion is used for the most frequently preferred choice, in which the mixture ratio ranges 5–20 weight percent, and preferably ranges 8–12 weight percent. This mixture ratio creates a static friction coefficient of the plate surface ranging from 0.4 to 0.7 by JIS-P-8147, ensuring stable paper handling.

As an adhesive, carboxymethyl cellulose and SBR-group latex is used with the mixture ratio ranges 10–20 weight percent, and preferably ranges 12–17 weight percent, for both. Derivatives of other cellulose, polyvinyl alcohol and their derivatives, and other water soluble polymers can be used instead of carboxymethyl cellulose.

As a cross linking agent for carboxymethyl cellulose, dialdehyde (glyoxal) is used with the mixture ratio ranges 0.3–2.0 weight percent, and preferably ranges 0.5–1.2 weight percent.

As a water resistant agent for the hydrophilic coating, a urea-melamine resin is used with the mixture ratio range 0.3–2.0 weight percent, and preferably ranges 0.8–1.2 weight percent.

Other cross linking agents and water resistant agents can be used, for instance, in the polyamide, polyurea, amino resin and epoxy compounds.

A water resistant middle layer and a hydrophilic surface layer can be formed on at least one side of the base paper, but it is better to form them on both sides for preventing the curling of the obtained paper plate as well as for easy plate making without distinguishing the coated side from the uncoated side.

If these layers are coated only on one side of the base paper, the curling of the paper plate can be prevented by coating on the other side of the base paper a certain amount of starch, polyvinyl alcohol, sizing agent, and so forth.

By this treatment, the paper plate for office offset printing is completed with a Bekk smoothness of 70–200 seconds, and preferably of 100–150 seconds by JIS-P-8119.

Examples

Figure 2:
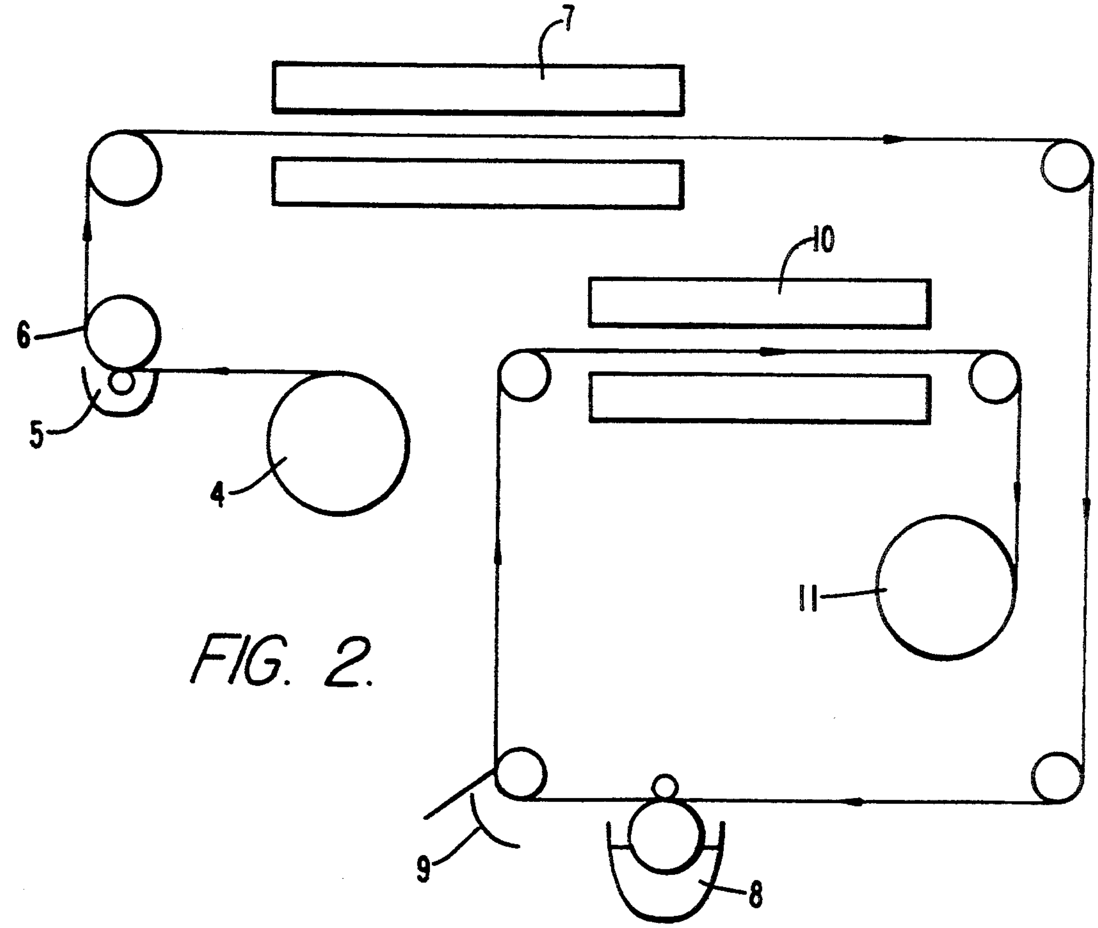
FIG. 2 is a diagram illustrating a method of making the paper plate product.
Figure 3:
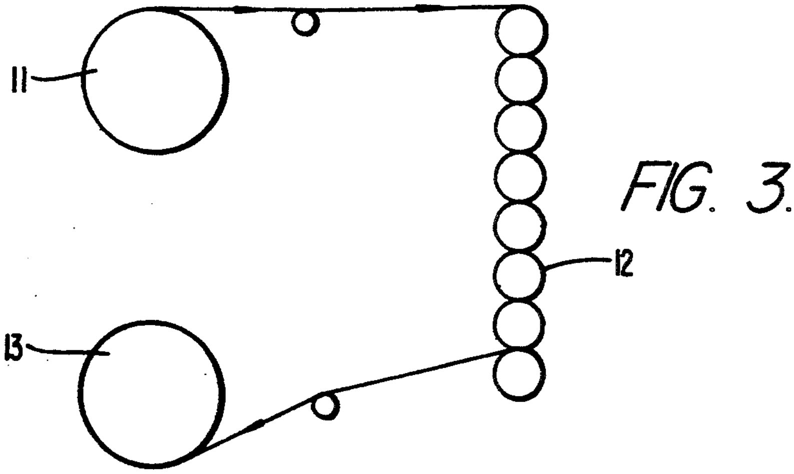
FIG. 3 is a diagram illustrating the subsequent method step of calendering the paper plate strips.

The method of making the paper plate is illustrated in FIGS. 2 and 3.

Formation of water resistant middle layer

To form a water resistant middle layer, paper may be supplied from a supply reel 4 and moved (as indicated by the arrows) between a supply of the middle layer 5 and a suitable known coater 6, such as a blade coater, an air knife coater, a rod coater, or a wire bar coater to apply the coating color of the synthetic latex described above, so that the absolute dry weight of the synthetic latex ranges 0.5–5.0 $g/m^2$, preferably ranges 1.5–3.0 $g/m^2$, and the coat is then dried for 20–40 seconds at 105°–120° C. by movement through a dryer 7.

Formation of hydrophilic layer

To form a hydrophilic surface layer, the paper with the dried middle layer is then fed through a suitable coating station 8, and then to a suitable coater 9, such as a blade coater, an air knife coater, a rod coater, a wire bar coater, a roll coater, a gravure coater, or a die coater, to apply the coating color described above so that the absolute dry weight percent ranges between 1–6 $g/m^2$, and preferably ranges 2–4 $g/m^2$, and the coat is then dried for 40–70 seconds at 105°–120° C. The plate is wound on a take up reel 11.

Surface smoothing treatment

In addition to forming a water resistant middle layer and a hydrophilic surface layer on the base paper, or to applying a curl prevention processing on the other side as described above, if these layers are coated on one side, a surface smoothing treatment that provides smoothness on the surface of the paper plate can be made as seen in FIG. 3 by moving the coated paper from the take up reel 11 through a super calender or similar smoothing device 12 by a take up reel 13.

In the following, the invention is explained in detail by examples.

Example 1

As a base paper the wood free paper of basis weight 95 $g/m^2$ was used. On one side of it a water resistant middle layer was formed by coating weight 3 $g/m^2$ of water resistant dispersion with the component ratios as below using a blade coater and drying it for 30 seconds at 120° C. Then a hydrophilic surface layer was formed by coating weight 3 $g/m^2$ of hydrophilic coating color with the component ratios as below using an air knife coater and drying it for 60 seconds at 120° C. Finally, a surface smoothing treatment was applied by using a super calender at a roll temperature of 40° C., line pressure of 130 kg/cm, and nine nips. This paper plate for office offset printing was obtained by the processes described above.

Components of a water resistant middle layer

MBR group synthetic latex (Polilac 750N by Mitsui Toatsu Kagaku, Co., Ltd.): 100 weight percent.

Ground calcium carbonate (Softon 1500 by Bihoku Funka Kogyo Co., Ltd.): 50 weight percent.

Carboxymethyl cellulose (CMC 1173 by Daiseru Kagaku, Co., Ltd.): 1 weight percent.

For the above mixtue, a water coating color of 40% solid was prepared.

Components of a hydrophilic surface layer

Colloidal silica (Cataloid SI-30 with particle size 10 nm by Syokubai Kagaku Kogyo Co., Ltd.): 100 weight percent.

Ground Calcium Carbonate (Softon 2200 by Bihoku Funka Kogyo, Co., Ltd.): 100 weight percent Carboxymethyl cellulose (CMC 1173 by Daiseru Kagaku Co., Ltd.): 15 weight percent, SBR group synthetic latex (L-1622 by Asahi Kasei Kogyo Co., Ltd.): 15 weight percent.

CMC cross linking agent (Glyoxal by Nihon Gosei Kagaku Kogyo, Co., Ltd.): 0.7 weight percent.

Water resistant agent (Sumilase 613 by Sumitomo Kagaku Kogyo Co., Ltd.): 1 weight percent.

Slip agent (JW-26 by Johnson Polymer): 10 weight percent.

For the above mixture, a water coating color of 15% solid was prepared.

Example 2

In the same way as in Example 1, a paper plate for office offset printing plate was obtained, except use was made for a different colloidal silica (Snowtex S with particle size 7–9 nm by Nissan Kagaku Kogyo, Co., Ltd.) as the component for a hydrophilic surface layer.

Example 3

In the same was as in Example 1, a paper plate for office offset printing plate was obtained, except use was made for a different colloidal silica (Snowtex S with particle size 7–9 nm by Nissan Kagaku Kogyo, Co., Ltd.), and in addition the mixture ratio for a slip agent being changed to 7 weight percent, as the component for a hydrophilic surface layer.

Example 4

In the same way as in Example 1, a paper plate for office offset printing plate was obtained, except use was made for different components for a water resistant coating color as below.

Components of a hydrophilic surface layer

MBR group synthetic latex (Polilac 750N by Mitsui Toatsu Kagaku, Co., Ltd.): 100 weight percent, and Carboxymethyl cellulose (CMC 1173 by Daiseru Kagaku, Co., Ltd.): 1 weight percent.

For the above mixture, a water coating color of 40% solid was prepared.

Example 5

By using the same base paper as in Example 1, a double sided coating paper plate for office offset printing plate was obtained by coating both sides of the base paper in the same way as in Example 1.

Comparison 1

In the same way as in Example 1, a paper plate for office offset printing plate was obtained, except use was made for a different colloidal silica (Snowtex 20L with particle size 40–50 nm by Nissan Kagaku Kogyo, Co., Ltd.) as the component for a hydrophilic surface layer.

Comparison 2

In the same way as in Example 1, a paper plate for office offset printing plate was obtained, except the slip agent (JW-26 by Johnson Polymer) being excluded as the component for a hydrophilic surface layer.

Comparison 3

In the same way as in Example 1, a paper plate for office offset printing plate was obtained, except use was made for the slip agent (JW-26 by Johnson Polymer) of 3 weight percent as the component for a hydrophilic surface layer.

Test subjects and test methods

For the samples obtained in the examples and the comparison examples as described above, the testing was made by using the test subjects, the test methods, and the assessment methods as follows:

(1) Surface hydrophile property (wetting degree)

By using a goniometer, immediately after putting a drop of distilled water on the sample plate surface, the contact angle between the edge of the drop and the plate surface was measured, and thus the wetting degree was obtained.

(2) Static friction coefficient

The test was made by JIS-P-8174

(3) Smoothness

The test was made by JIS-P-8119

(4) Plate fog

By using an offset press (AB Dick 369) working at 5000 sheets per hour, the degree of the plate fog, i.e., the degree of ink fixing onto the non-image area, was visually evaluated.

Judgement: G for Good, F for Fair, P for Poor (5) Printing strength

By using an offset press (AB Dick 369) working at 5000 sheets per hour, the change state in strength of the paper plate surface was visually evaluated.

Judgement: G for Good, F for Fair, P for Poor (6) Paper Handling Operation

By using a copier (Fuji Xerox Vivace 400) and a laser printer (Hewlett-Packard LaserJet III) for plate making and using an offset press (AB Dick 369) working at 5000 sheets per hour for offset printing, the paper handling operation was visually evaluated.

| | Examples | | | | | Comparisons | | |
|---|---|---|---|---|---|---|---|---|
| Test Subject | No. 1 | No. 2 | No. 3 | No. 4 | No. 5 | No. 1 | No. 2 | No. 3 |
| Contact Angle (degree) | 24.0 | 28.3 | 29.1 | 20.3 | 24.0 | 19.3 | 20.0 | 21.2 |
| Static Friction Coefficient | 0.54 | 0.48 | 0.62 | 0.54 | 0.57 | 0.49 | 0.78 | 0.71 |
| Smoothness (second) | 124 | 135 | 140 | 119 | 136 | 146 | 130 | 126 |
| Plate Fog | G | G | G | G | G | P | G | G |
| Surface Printing Strength | G | G | G | G | G | P | G | G |
| Paper Handling | | | | | | | | |
| at Plate-making | G | G | G | G | G | G | P | P |
| at Offset Printing | G | G | G | G | G | G | F | F |

Effect of the invention

This invention, as shown in the test results above, can provide a paper plate for office offset printing that satisfies the conditions described in claim 1 to 3, and the best features of contact angle, static friction coefficient, smoothness, plate fog, print strength, paper handling, and so forth.

What is claimed is:

1. A paper plate for office offset printing in which at least one side of the base paper is composed of a water resistant middle layer made primarily of synthetic latex and a hydrophilic surface printing layer applied to the top of the said water resistant middle layer, said surface printing layer being made primarily of colloidal silica particles 20 nm or less in diameter, a slip agent in a range of 5–20 weight percent and an adhesive.

2. A paper plate for office offset printing of claim 1 in which a polyethylene wax emulsion is used as said slip agent for a hydrophilic surface layer and the static friction coefficient of the paper plate surface is in the range from 0.4 to 0.7 by JIS-P-8147.

3. A paper plate as defined in claim 1 wherein said middle layer and said surface layer are applied to only one side of the base paper and the other side of said base paper has a curl preventing material thereon.

4. A paper plate as defined in claim 1 wherein said middle layer and said surface layer are applied to only one side of the base paper and the other side of said base paper has a calendered surface.

* * * * *

UNITED STATES PATENT AND TRADEMARK OFFICE

CERTIFICATE OF CORRECTION

PATENT NO. : 5,425,998

DATED : June 20, 1995

INVENTOR(S) : Minakawa, Masami et al

It is certified that error appears in the above-indentified patent and that said Letters Patent is hereby corrected as shown below:

ON THE TITLE PAGE:

Item [73] Assignee: Gradco (Japan) Ltd., and
Nippon Kakohn Sieshi Co., Ltd.,
both of Tokyo, Japan Signed and Sealed this Twenty-third Day of April, 1996

Attest:

BRUCE LEHMAN

*Attesting Officer* *Commissioner of Patents and Trademarks*